(12) United States Patent
Eismark et al.

(10) Patent No.: US 12,146,455 B2
(45) Date of Patent: Nov. 19, 2024

(54) NOZZLE CAP FOR A FUEL INJECTION NOZZLE OPERABLE IN A HYDROGEN INTERNAL COMBUSTION ENGINE

(71) Applicant: VOLVO TRUCK CORPORATION, Gothenburg (SE)

(72) Inventors: Jan Eismark, Gothenburg (SE); Gustavo Hindi, Surte (SE); Rickard Ehleskog, Hisings Backa (SE); Tommy Simonsson, Stenungsund (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 18/579,724

(22) PCT Filed: Jul. 23, 2021

(86) PCT No.: PCT/EP2021/070707
§ 371 (c)(1),
(2) Date: Jan. 16, 2024

(87) PCT Pub. No.: WO2023/001384
PCT Pub. Date: Jan. 26, 2023

(65) Prior Publication Data
US 2024/0344488 A1   Oct. 17, 2024

(51) Int. Cl.
*F02M 21/02* (2006.01)
*F02M 61/18* (2006.01)

(52) U.S. Cl.
CPC ...... *F02M 21/026* (2013.01); *F02M 21/0206* (2013.01); *F02M 61/1806* (2013.01)

(58) Field of Classification Search
CPC ............. F02M 21/0206; F02M 21/026; F02M 21/0281; F02M 61/1806; F02M 61/1833;
(Continued)

(56) References Cited

U.S. PATENT DOCUMENTS

| 1,700,903 | A | * | 2/1929 | Marburg | ................. | F02B 21/02 |
| | | | | | | 123/275 |
| 4,426,966 | A | * | 1/1984 | Huther | ................. | F02B 19/165 |
| | | | | | | 123/270 |

(Continued)

FOREIGN PATENT DOCUMENTS

| CN | 104863760 A | 8/2015 |
| CN | 107143421 A | 9/2017 |

(Continued)

OTHER PUBLICATIONS

International Search Report and Written Opinion of the International Searching Authority in corresponding International Application No. PCT/EP2021/070707 mailed Mar. 31, 2022 (12 pages).

(Continued)

*Primary Examiner* — John M Zaleskas
(74) *Attorney, Agent, or Firm* — Venable LLP; Jeffri A. Kaminski

(57) ABSTRACT

A nozzle cap for a fuel injection nozzle operable in a hydrogen internal combustion engine includes an inlet for receiving a flow of hydrogen controllable by an inlet valve arrangeable in the inlet, at least one outlet for providing an exit flow of hydrogen, and an internal bottom flow-guiding body arranged at a bottom side of the nozzle cap downstream of the inlet in a nozzle cap volume, the internal bottom flow-guiding body protruding towards the inlet and comprises a flow-guiding surface for re-directing a flow of hydrogen from the inlet towards the outlet.

19 Claims, 8 Drawing Sheets

(58) Field of Classification Search
CPC .............. F02M 61/184; F02B 19/1004; F02B 19/1014; F02B 19/108; F02B 19/1085; F02B 19/16
See application file for complete search history.

(56) References Cited

U.S. PATENT DOCUMENTS

| | | | | |
|---|---|---|---|---|
| 4,483,291 A | * | 11/1984 | Artman | F02B 19/12 |
| | | | | 123/286 |
| 4,862,857 A | * | 9/1989 | Donohue | F02M 61/1806 |
| | | | | 123/534 |
| 5,035,360 A | * | 7/1991 | Green | F02M 51/0614 |
| | | | | 251/129.09 |
| 5,222,993 A | * | 6/1993 | Crane | F02M 21/029 |
| | | | | 123/266 |
| 5,301,879 A | * | 4/1994 | Takeda | F02M 69/047 |
| | | | | 239/524 |
| 5,484,108 A | * | 1/1996 | Nally | F02M 61/1853 |
| | | | | 239/585.4 |
| 5,540,387 A | * | 7/1996 | Reiter | F02M 51/0682 |
| | | | | 239/596 |
| 5,826,804 A | * | 10/1998 | Reiter | F02M 69/047 |
| | | | | 239/596 |
| 5,924,402 A | * | 7/1999 | Regueiro | F02B 19/14 |
| | | | | 123/254 |
| 7,487,750 B2 | | 2/2009 | Leone et al. | |
| 2003/0213461 A1 | * | 11/2003 | Regueiro | F02B 19/18 |
| | | | | 123/262 |
| 2006/0081722 A1 | * | 4/2006 | Kato | F02M 21/0263 |
| | | | | 239/96 |
| 2006/0097079 A1 | * | 5/2006 | Goenka | F02M 61/1853 |
| | | | | 239/596 |
| 2006/0097080 A1 | * | 5/2006 | Goenka | F02M 61/1806 |
| | | | | 239/584 |
| 2006/0097081 A1 | * | 5/2006 | Goenka | F02M 61/1806 |
| | | | | 239/584 |
| 2009/0151698 A1 | * | 6/2009 | Ellgas | F02M 35/10268 |
| | | | | 123/445 |
| 2014/0084085 A1 | * | 3/2014 | Hongo | B05B 1/34 |
| | | | | 239/584 |
| 2017/0321636 A1 | * | 11/2017 | Moser | F02M 21/0275 |
| 2017/0328310 A1 | * | 11/2017 | Hohl | F02B 17/005 |
| 2018/0363614 A1 | * | 12/2018 | Martin | F02M 61/10 |
| 2021/0095627 A1 | * | 4/2021 | Dantes | F02M 61/166 |

FOREIGN PATENT DOCUMENTS

| | | | | |
|---|---|---|---|---|
| CN | 112211714 A | * | 1/2021 | |
| FR | 456230 A | * | 8/1913 | |
| JP | 2016089835 A | * | 5/2016 | ............ F02B 23/104 |
| WO | WO-2018130772 A1 | * | 7/2018 | ............ F02B 19/02 |

OTHER PUBLICATIONS

International Preliminary Report on Patentability in corresponding International Application No. PCT/EP2021/070707 mailed Jun. 6, 2023 (8 pages).

* cited by examiner

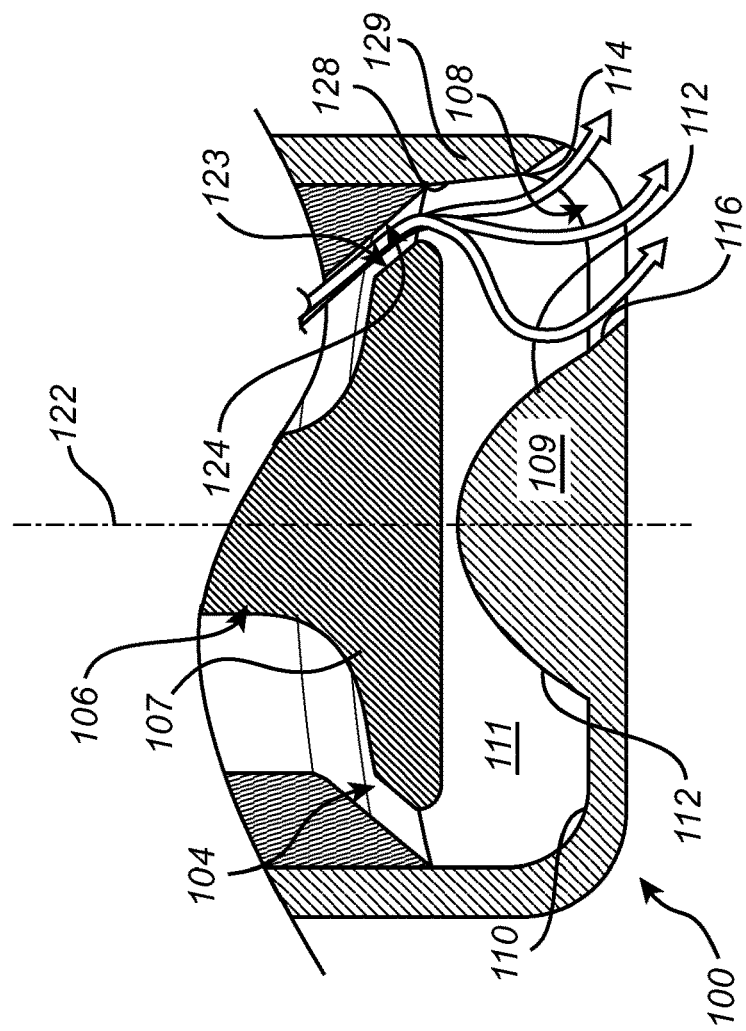
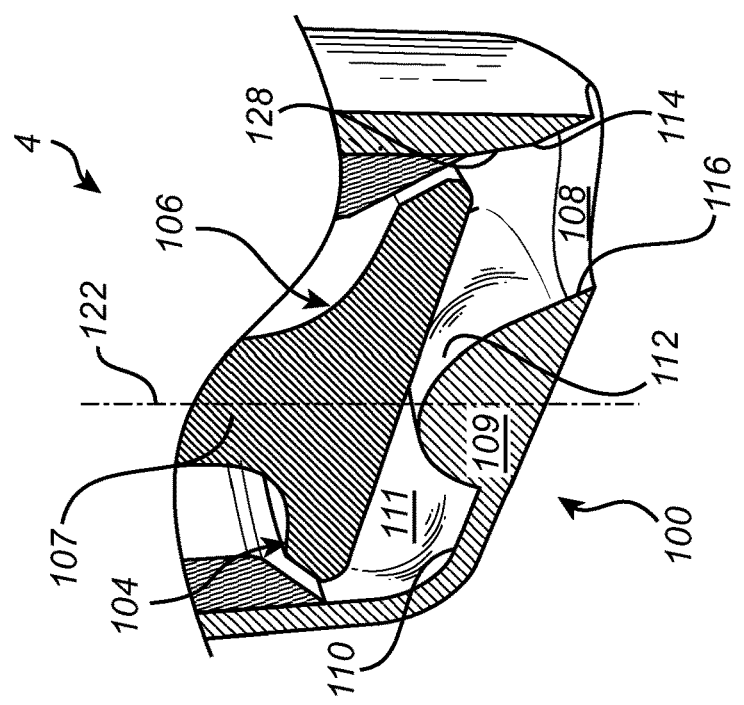
Fig. 2B
Fig. 2A

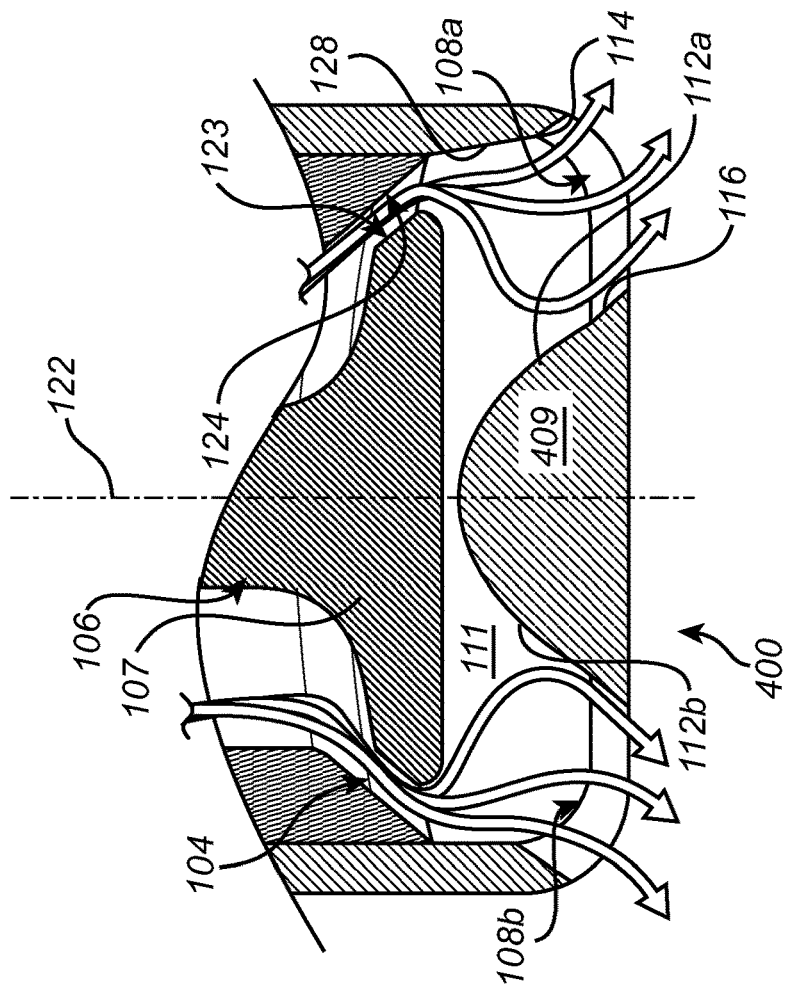
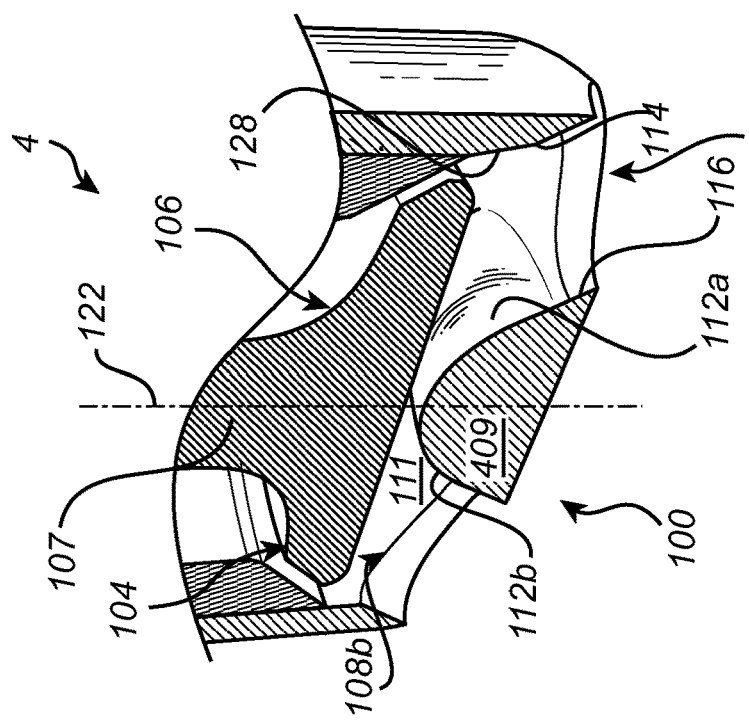

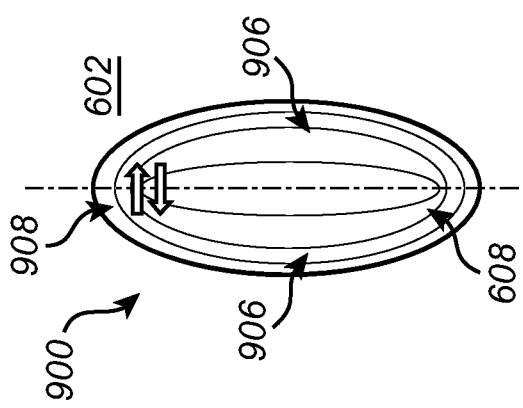
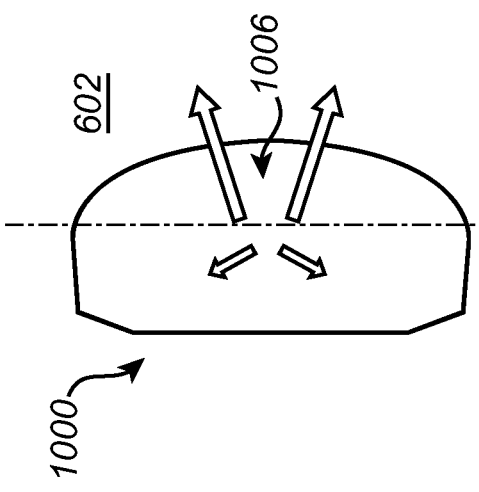
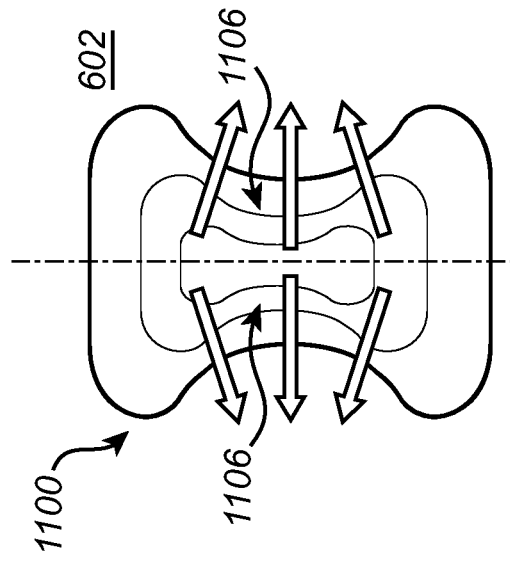
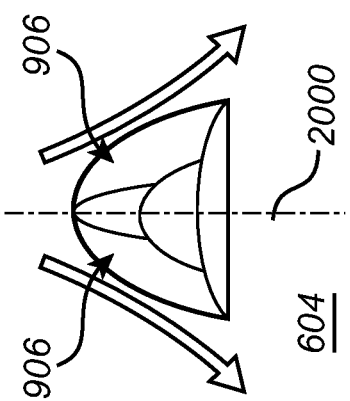
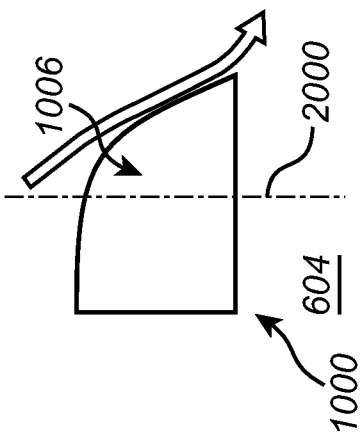
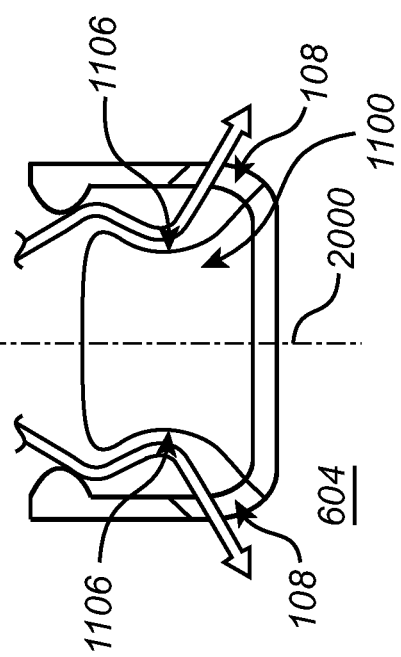
Fig. 6D   Fig. 6E   Fig. 6F

NOZZLE CAP FOR A FUEL INJECTION NOZZLE OPERABLE IN A HYDROGEN INTERNAL COMBUSTION ENGINE

CROSS-REFERENCE TO RELATED APPLICATIONS

This application is a U.S. National Stage application of PCT/EP2021/070707, Jul. 23, 2021 and published on Jan. 26, 2023 as WO 2023/001384, all of which is hereby incorporated by reference in its entirety.

TECHNICAL FIELD

The present disclosure relates to a nozzle cap for a fuel injection nozzle operable in a hydrogen internal combustion engine. The present disclosure also relates to a corresponding fuel injection nozzle, to a hydrogen internal combustion engine, and to vehicle. Although the invention will be described in relation to a vehicle in the form of a truck, the invention can also be efficiently incorporated in other vehicles types such as e.g. buses and construction equipment, as well as for marine applications, genset applications, and cars.

BACKGROUND

A hydrogen injector for a hydrogen engine is typically run at critical conditions at which the hydrogen flow becomes sonic or even locally supersonic. One problem with this type of flow is difficulties to maintain the initial direction of the jet out of the injector nozzle.

One commonly used hydrogen nozzle is a so called pintle-valve nozzle. An angle of the upper part of the pintle valve surface is a design-parameter which may determine the outgoing direction of the jet. In order to further control the outgoing direction of the jet, a pintle-valve can be combined with a nozzle cap. The cap comprises one or several holes and the configuration of the holes is often used to determine the direction of the outgoing jet.

A particular problem with a hydrogen nozzle is that the nozzle cap hole exit area needs to be larger than conventional engine nozzles. This means that a major part of the nozzle cap side and bottom sides are open holes. It is therefore difficult to design the holes to direct the jets in a wanted direction, especially at sonic or even locally supersonic hydrogen flow. Further, this may lead to disturbing vortices in the cap volume. Such disturbing vortices may re-direct part of the flow in an un-favourable direction. Furthermore, the cap-volume as such may contain residual hydrogen-containing gases that may auto-ignite at an un-favourable timing.

Accordingly, there is room for improvements with regards to hydrogen flow guidance in hydrogen nozzles.

SUMMARY

An object of the invention is to provide a nozzle cap for fuel injection nozzle that at least partly alleviates the deficiencies with the prior art.

According to a first aspect of the invention, the object is achieved by a nozzle cap according to claim 1.

According to the first aspect of the invention, there is provided a nozzle cap for a fuel injection nozzle operable in a hydrogen internal combustion engine. The nozzle cap comprising an inlet for receiving a flow of hydrogen controllable by an inlet valve arrangeable in the inlet. At least one outlet for providing an exit flow of hydrogen, and an internal bottom flow-guiding body arranged at a bottom side of the nozzle cap downstream of the inlet in a nozzle cap volume. The internal bottom flow-guiding body protrudes towards the inlet and comprises a flow-guiding surface for re-directing a flow of hydrogen from the inlet towards the outlet.

The present invention is based on the realization that to minimize circular flow in the nozzle cap the internal structures and surfaces of the nozzle cap can be modified to lead the flow of hydrogen towards the outlet of the nozzle cap with reduced vortices in the inner volume of the nozzle cap. One advantageous inner structure is the internal bottom flow-guiding body which defines a flow-guiding surface that is in contact with the stream of hydrogen gas. This internal bottom flow-guiding body advantageously leads the hydrogen gas towards the outlet while at the same time reducing the dead-volume in the cap which reduces the amount of residual hydrogen that can remain in the nozzle cap.

Thus, by the provision of the herein proposed nozzle cap the hydrogen stream is guided towards the outlet such that hydrogen injection for the hydrogen internal combustion engine can be efficiently performed.

The inlet valve arrangeable in the inlet of the nozzle cap may for example be a pintle valve that are per se known in the art, although other types or valves are conceivable.

The outlet of the nozzle cap directs the hydrogen stream into, or towards a combustion chamber of the hydrogen internal combustion engine.

In one embodiment, the outlet may comprise a first exit surface and a second exit surface forming the outlet, wherein the shape of the first exit surface substantially follows the shape of the second exit surface, such that the exit flow of hydrogen from the outlet at the first exit surface is in substantially the same direction as the exit flow of hydrogen at the second exit surface. Thus, the surfaces of the outlet are adapted to further improve the guidance of the hydrogen stream. The exits surfaces are in this way intentionally shaped to control the exit direction of the hydrogen flow. The first and second exit surfaces may be considered hole-edge surfaces of the outlet. That the exit flow is in substantially the same direction should be interpreted as that the main flow is in the same direction or near the same direction where a small deviation is allowed.

In one embodiment, the nozzle cap may further comprise at least a first internal side flow-guiding body arranged at a side-wall surface of the nozzle cap and protruding inwards in a nozzle cap volume, for guiding the flow of hydrogen towards the at least one outlet. Hereby, guiding of the hydrogen flow is even further improved. The at least one internal side flow-guiding body provides at least one additional flow-guiding surface that contributes to reducing vortices in the nozzle cap volume by assisting in leading the hydrogen flow towards the outlet. The first internal side flow-guiding body cooperates with the internal bottom flow-guiding body to lead the hydrogen flow towards the outlet.

In one embodiment, the outlet may comprise a first exit surface and a second exit surface forming the outlet, wherein the shape of the at least one first internal side flow-guiding body substantially follows a shape of the flow-guiding surface of the internal bottom flow-guiding body, such that the exit flow of hydrogen from the outlet at the first exit surface is in substantially the same direction as the exit flow of hydrogen at the second exit surface. That the exit flow is in substantially the same direction should be interpreted as that the main flow is in the same direction or near the same direction where a small deviation is allowed. Hereby, the first internal side flow-guiding body and the internal flow-guiding body advantageously cooperates to better guide the hydrogen stream towards the outlet.

The shape of the outlet along the flow direction may be that the first and second exit surfaces are parallel. However, other outlet shapes or configurations are possible. For example, in one embodiment, the outlet comprises a first exit surface and a second exit surface forming the outlet, wherein the first exit surface and a second exit surface together form a conical outlet.

In one embodiment, the outlet may comprise a first exit surface and a second exit surface, wherein the flow-guiding surface of the internal bottom flow-guiding body is arranged next to the second exit surface, the flow-guiding surface and the second exit surface are configured to co-operatively direct the exit flow of hydrogen at the second exit surface in the same direction as the exit flow of hydrogen at the first exit surface. Hereby, the nozzle cap is further improved to guide the hydrogen flow towards the outlet. That the internal bottom flow-guiding body is arranged next to the second exit surface means that they are directly neighbouring, i.e. being adjacent to each other. The flow-guiding surface of the internal bottom flow-guiding body and the second exit surface may form a single seamless flow-guiding surface.

In one embodiment, the internal bottom flow-guiding body may be configured to redirect a flow of hydrogen towards to two opposite sides of the nozzle cap. The opposite sides may be on two sides of a centre axis of the nozzle cap. This is advantageous if, for example, the nozzle cap comprises outlets on the two opposite sides.

In one embodiment, the nozzle cap may comprise two outlets arranged on opposite sides of the internal bottom flow-guiding body, wherein the internal flow-guiding bodies are configured to redirect a flow of hydrogen from the inlet towards the two outlets.

In one embodiment, the internal bottom flow-guiding body may be shaped to fill-out the volume between two outlets in the nozzle cap volume. Hereby, the amount of residual hydrogen in the nozzle cap is reduced. Further, cross-flow across the nozzle cap, between the sides of the two outlets, is reduced thereby leading to less vortices in the nozzle cap.

In embodiments, the internal bottom flow-guiding body may be centralized in the bottom of the nozzle cap.

In other embodiments, the internal bottom flow-guiding body may be arranged off-set from a centre of the bottom of the nozzle cap.

Different offsets and locations of the internal bottom flow-guiding body are advantageous depending on specific implementations at hand. For example, an offset arrangement may be used in some implementations, e.g. with only one outlet to reduce flow to a side not having an outlet. A centralized location may be advantageous when it is desirable to direct equal amount so flow to the different sides of the nozzle cap.

In one embodiment, the internal bottom flow-guiding body may be shaped to substantially fill the side of the nozzle cap opposite the outlet. Hereby, the dead-volume in the nozzle cap is advantageously reduced which leads to reduced amount of residual hydrogen that can remain in the nozzle cap.

In one embodiment, the number of outlets is more than two, wherein the internal bottom flow-guiding body comprising a set of flow-guiding surfaces for re-directing a flow of hydrogen towards each of the outlets. Thus, the internal bottom flow-guiding body may advantageously be designed in correspondence with the number of outlets, still providing improved flow of hydrogen through the nozzle cap.

The nozzle cap may have different outer shapes depending on the implementations at hand.

For example, in one embodiment, the internal bottom flow-guiding body may have a convex outer shape.

In another embodiment, the internal bottom flow-guiding body may have a concave outer shape.

In one embodiment, the internal bottom flow-guiding body comprises flow-guiding elements protruding from the upper ridge of the internal bottom flow-guiding body for further providing further adjustments of the hydrogen-flow in the nozzle cap. Hereby, the nozzle cap is further improved to guide the hydrogen flow towards the outlet.

According to a second aspect of the invention, there is provided a fuel injection nozzle comprising an inlet valve and a nozzle cap according to any one of the herein disclosed embodiments.

Effects and features of the second aspect of the invention are largely analogous to those described above in connection with the first aspect.

According to a third aspect of the invention, there is provided a hydrogen internal combustion engine comprising a fuel injection nozzle according to the second aspect.

According to a fourth aspect of the invention, there is provided a vehicle comprising a fuel injection nozzle according to the second aspect or a hydrogen internal combustion engine according to the third aspect.

Effects and features of the third and fourth, aspects are largely analogous to those described above in relation to the first aspect and the second aspect.

Further features of, and advantages will become apparent when studying the appended claims and the following description. The skilled person will realize that different features may be combined to create embodiments other than those described in the following, without departing from the scope of the present disclosure.

BRIEF DESCRIPTION OF THE DRAWINGS

With reference to the appended drawings, below follows a more detailed description of embodiments of the invention cited as examples.

In the drawings:

FIG. 2A is a perspective cross-sectional view including a nozzle cap according to example embodiments of the invention;

FIG. 2B is a cross-sectional side-view of the nozzle cap and valve illustrated in FIG. 2A;

FIG. 4A is a perspective cross-sectional view including a nozzle cap according to example embodiments of the invention;

FIG. 4B is a cross-sectional side view of the nozzle cap and valve illustrated in FIG. 4A;

FIGS. 6A-6F conceptually illustrates different types of internal bottom flow-guiding bodies according to embodiments of the invention.

DETAILED DESCRIPTION OF EXAMPLE EMBODIMENTS OF THE INVENTION

Figure 1:
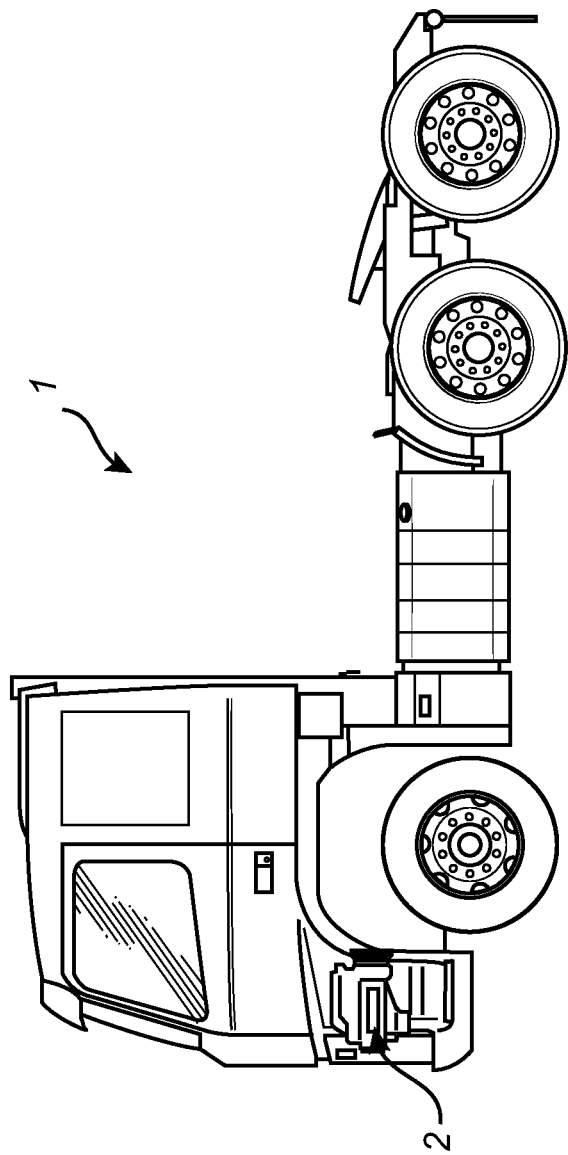
FIG. 1 is a vehicle in the form a truck according to example embodiments of the invention.

The present invention will now be described more fully hereinafter with reference to the accompanying drawings, in which exemplary embodiments of the invention are shown. The invention may, however, be embodied in many different forms and should not be construed as limited to the embodiments set forth herein; rather, these embodiments are provided for thoroughness and completeness. The skilled person will recognize that many changes and modifications may be made within the scope of the appended claims. Like reference character refer to like elements throughout the description.

FIG. 1 illustrates a vehicle in the form of a truck 1 comprising an engine 2 such as for example an internal combustion engine. The internal combustion engine is a hydrogen engine. The truck 1 may be a hybrid electric vehicle. The hydrogen internal combustion engine 2 of truck 1 further comprises a fuel injection nozzle with a nozzle cap as disclosed herein.

FIG. 2A is a perspective cross-sectional view of a nozzle cap 100 for a fuel injection nozzle 4 that, when in use, is operable in a hydrogen internal combustion engine 2. FIG. 2B is a cross-section of the nozzle cap 100 and valve shown in FIG. 2A. The nozzle cap 100 comprises an inlet 104 for receiving a flow of hydrogen. The flow of hydrogen is provided from storage of hydrogen that is typically pressurised. The flow of hydrogen through the inlet 104 is controllable by an inlet valve 106 arrangeable in the inlet 104. When the pintle 107 of the valve 106 is in an upper position, the inlet 104 is closed and hydrogen is not allowed to enter the nozzle cap volume 111. In the lower position shown in FIGS. 2A-B, the inlet 104 is open and hydrogen is allowed to enter the nozzle cap volume 11.

The nozzle cap 100 further comprises at least one outlet 108 for providing an exit flow of hydrogen. An internal bottom flow-guiding body 109 is arranged at a bottom side 110 of the nozzle cap 100 downstream of the inlet 104 in the nozzle cap volume 111, e.g. opposite the inlet 109. The internal bottom flow-guiding body 109 is shaped to protrude towards the inlet 104 and comprises a flow-guiding surface 112 for re-directing a flow of hydrogen received from the inlet 104 towards the outlet 108.

The hydrogen flow enters through the inlet 104 and is initially guided by the flow-guiding surface 123 of the valve 108 and the valve seat 124 before it enters the nozzle cap volume 111. If the internal bottom flow-guiding body 109 was not present, vortices are created inside the cap and suboptimal flow of hydrogen towards the outlet 108 is obtained. However, as provided by embodiments herein, the internal bottom flow-guiding body 109 provides improved hydrogen flow guidance towards the outlet 108.

The internal bottom flow-guiding body 109 extends along an axis 122 from the bottom side 110 towards the side of the inlet 104. The flow-guiding surface 112 of the internal bottom flow-guiding body 109 ensures that the flow of hydrogen follows its shape and is guided towards the outlet 104.

The internal bottom flow-guiding body 109 extends relatively close to the valve 108 which advantageously reduces cross-flow of hydrogen across the centre 122 of the internal bottom flow-guiding body 109 and here also the nozzle cap 100 which further improves the guidance of the hydrogen flow. Further, the size of the internal bottom flow-guiding body 109 is relatively large so that to fill-up a large portion of the nozzle cap volume 111. This reduces the risk for residual hydrogen to remain in the nozzle cap volume 106. Generally, the larger the size the better, however the size should not compromise the ability for the internal bottom flow-guiding body 109 to guide the hydrogen flow towards the outlet 108. In FIG. 2A-B, the internal bottom flow-guiding body is centralized in the nozzle cap 100.

Further, a flow-guiding surface 128 adjacent to the valve seat 124 is shaped to guide flow towards the outlet 108. The flow-guiding surface 128 is adjacent to the valve seat 124 so that a continuous flow-guiding surface is formed from the flow-guiding surface 128 and the valve seat 124.

The surfaces 112 and 128 cooperate to aerodynamically guide the flow towards the outlet 108. For example, the outlet 108 comprises a first exit surface 114 and a second exit surface 116 forming the outlet 108. These surfaces 114 and 116 are the hole edges of the outlet 108. In order to provide an efficient flow through the outlet 108, the shape of the first, upper exit surface 114, substantially follows the shape of the second, lower exit surface 116. In this way, the exit flow of hydrogen from the outlet 108 at the first exit surface 114 is in substantially the same direction as the exit flow of hydrogen at the second exit surface 116. Thus, the shape of the flow-guiding surface 112 and the exit surfaces 112 and 114 may be different depending on the relative locations of the outlet 108 and the inlet 104 but are adapted to guide the hydrogen flow towards the outlet 108. In FIG. 1, the internal bottom flow-guiding body 109 has a convex outer shape, thus forming a convex ridge in the nozzle cap. The cross-sectional shape of the flow-guiding surface 112 of the internal bottom flow-guiding body 109 and the second exit surface 116 may be curved in two directions resembling an S-shape.

The valve seat 124, the flow-guiding surface 128, and the first exit surface 114 preferably form a continuous, smooth, flow-guiding surface. Similarly, the flow-guiding surface 112 and the second exit surface 116 preferably form a continuous, smooth, flow-guiding surface. The flow-guiding surface 128 of the cap wall 129 and the flow-guiding surface 112 of the bottom flow-guiding body are smoothly connected through the hole edge surfaces 114 and 116.

It is also conceivable that the first exit surface and a second exit surface forming the outlet together form a conical outlet.

The flow-guiding surface 112 of the internal bottom flow-guiding body 109 is arranged next to the second exit surface 116. Preferably, the flow-guiding surface 112 and the second exit surface form a seamless flow-guiding surface extending along the internal bottom flow-guiding body 109 all the way to the outlet 108. The flow-guiding surface 112 and the second exit surface 116 are configured to co-operatively direct the exit flow of hydrogen at the second exit surface in the same direction as the exit flow of hydrogen at the first exit surface 116.

Figure 3:
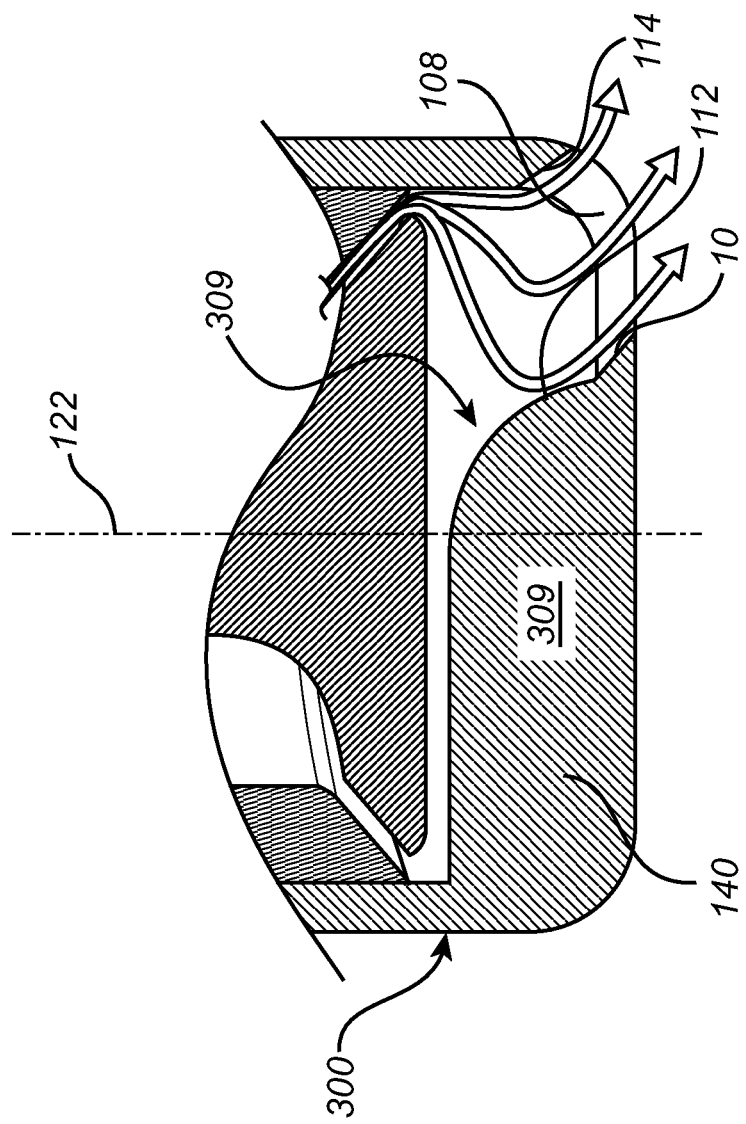
FIG. 3 is a cross-sectional side-view including a nozzle cap according to example embodiments of the invention.

FIG. 3 conceptually illustrates a further embodiment of the present invention. This embodiment may be primarily intended for a single-hole cap with a main hole-direction presenting a certain angle related to the injector centre axis direction. The nozzle cap 300 illustrated in FIG. 3 differs from that shown in FIG. 2A-B in that the internal bottom flow-guiding body 309 is shaped to substantially fill the side 140 of the nozzle cap opposite the outlet 108. In other words, instead of leaving an open volume on the side of the internal bottom flow-guiding body 109 where there is no outlet, the internal bottom flow-guiding body 309 fills up that volume. This significantly reduces the amount of residual hydrogen that can remain in the nozzle cap 300.

The number of outlets of the nozzle cap may be more than one. Turning to FIG. 4A-B, there is shown a nozzle cap 400 having two outlets 108a-b. FIG. 4A is a perspective cross-sectional view of the nozzle cap 400 and FIG. 4B is a cross-section of the nozzle cap 400.

The internal bottom flow-guiding body 409 is configured to redirect a flow of hydrogen towards to two opposite sides of the nozzle cap 400, where the two outlets are located. Thus, the internal bottom flow-guiding body 409 comprises two opposite flow-guiding surfaces 112a-b. A first flow-guiding surface 112a is configured to guide hydrogen flow towards a first outlet 108a and second flow-guiding surface 112b is configured to guide hydrogen flow towards a second outlet 108b.

Figure 5:
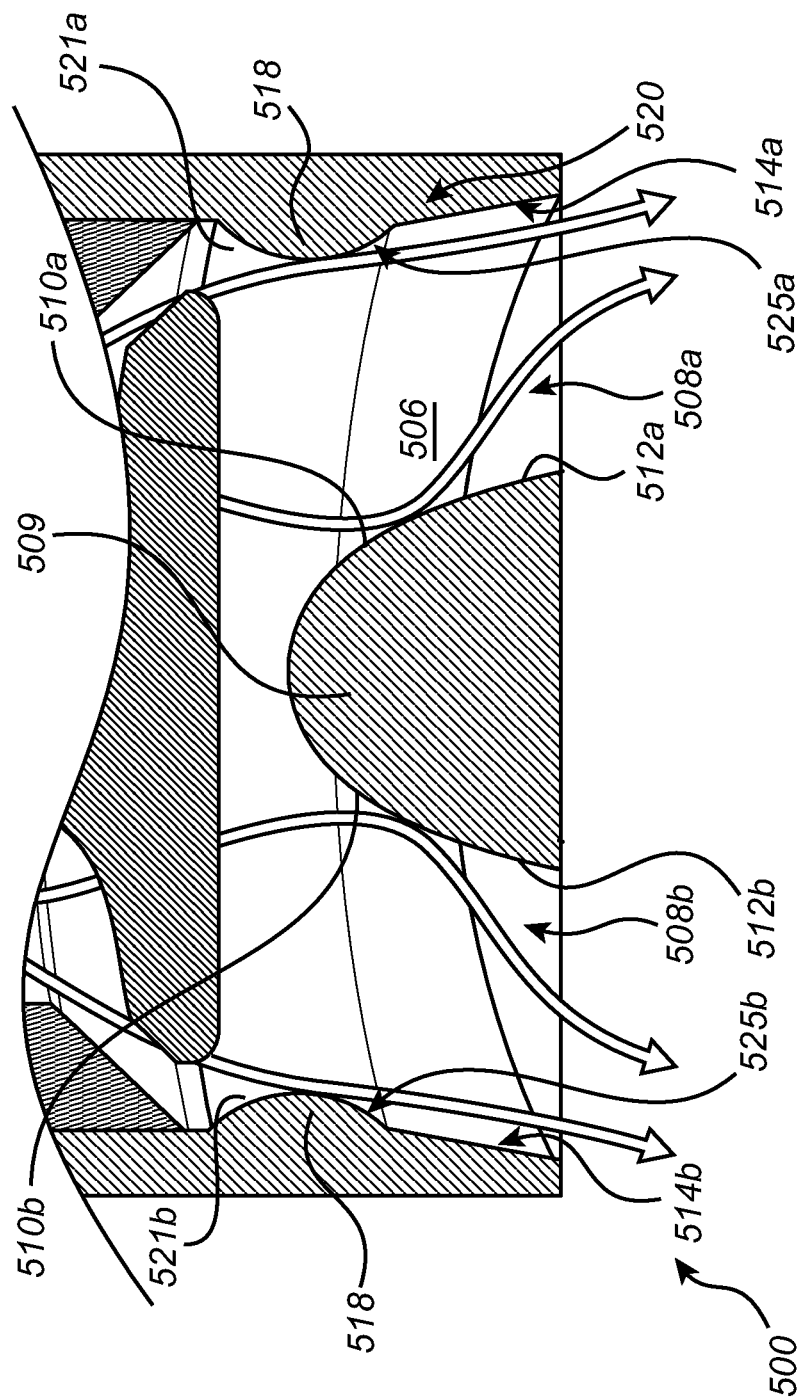
FIG. 5 is a cross-sectional side view including a nozzle cap according to example embodiments of the invention.

FIG. 5 conceptually illustrates a further embodiment of a nozzle cap. Here, the nozzle cap 500 comprises an internal bottom flow-guiding body 509 as discussed above with reference to preceding drawings, and two outlets 508a-b. Further, the nozzle cap 500 comprises at least a first internal side flow-guiding body 518 arranged at a side-wall 520 of the nozzle cap 500 and protruding inwards in a nozzle cap volume 506, for guiding the flow of hydrogen towards the outlets 508a-b. Thus, the internal bodies 518 and 509 defines outer surfaces 510a-b, and 521a-b that are in contact with the hydrogen flow and that are cooperatively configured to lead the flow of hydrogen towards the outlets to reduce vortices in the cap volume 506.

The first internal side flow-guiding body 518 is shaped with a convex outer surface to allow for receiving the flow form the inlet and guide the flow over surface of the guiding the flow along the internal flow-guiding body 518, with assistance from the oppositely arranged internal bottom flow-guiding body 509 with respect to the outlets 508a-b.

Preferably, a shape of a surface portion 525 of the at least one first internal side flow-guiding body 521a-b substantially follows a shape of the flow-guiding surface 510a-b of the internal bottom flow-guiding body, such that the exit flow of hydrogen from the outlet at a first exit surface 512a and 512b is in substantially the same direction as the exit flow of hydrogen at a second exit surface 514a and 514b, respectively. Preferably, the shape of the surface portion 525b of the internal side flow-guiding body 521b adjacent to the second exit surface 514b is substantially similar to the shape of the internal bottom flow-guiding body 509 in surface portions opposite the surface portion 525b. Similarly, at the other outlet 108a, the shape of the surface portion 525a of the internal side flow-guiding body 521a adjacent to the second exit surface 514a is substantially similar to the shape of the internal bottom flow-guiding body 509 in surface portions opposite the surface portion 525a.

Generally, the internal flow-guiding bodies 509, 521a-b are configured to redirect a flow of hydrogen from the inlet towards the two outlets 508a-b.

In case the number of outlets is more than two, the internal bottom flow-guiding body comprising a set of flow-guiding surfaces for re-directing a flow of hydrogen towards each of the outlets.

For each of the embodiments discussed with respect to FIGS. 4A, 4B, and FIG. 5, is advantageous to have the internal bottom flow-guiding body to be shaped to fill-out the volume between two outlets in the nozzle cap volume. Thus, the internal bottom flow-guiding body reaches across the entire inner volume of the nozzle cap, from side-to-side, but leaves the openings open. Further, the internal bottom flow-guiding body 509, 109 is centralized in the bottom of the nozzle cap.

FIGS. 6A-F conceptually illustrates different configurations for internal bottom flow-guiding bodies. In FIGS. 6A-F example height curves and shapes of the internal bottom flow-guiding bodies are illustrated. However, these are only examples, and variations are possible and within the scope of the present invention. The shape of the internal bottom flow-guiding bodies is generally configured to assist the flow of hydrogen to efficiently reach the outlet of the nozzle cap in a preferred direction.

Figure 6C:
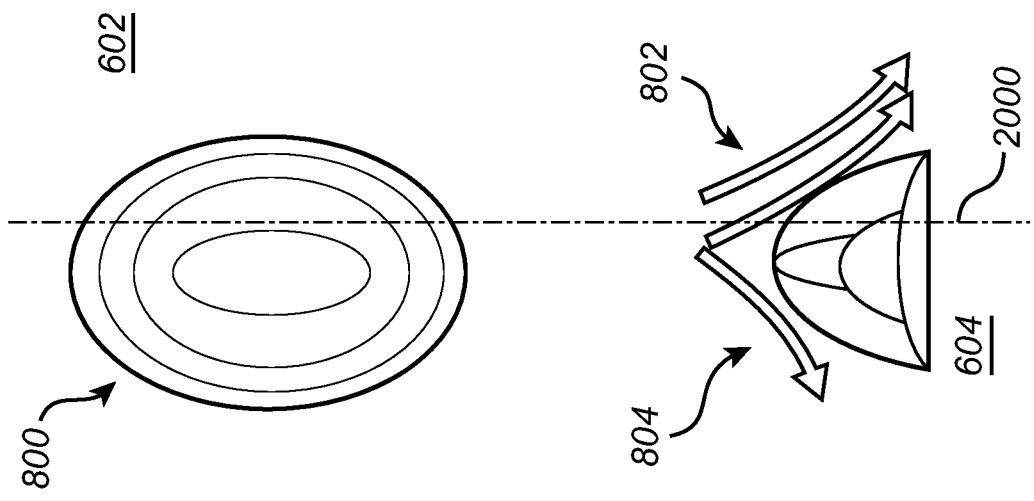
Figure 6B:
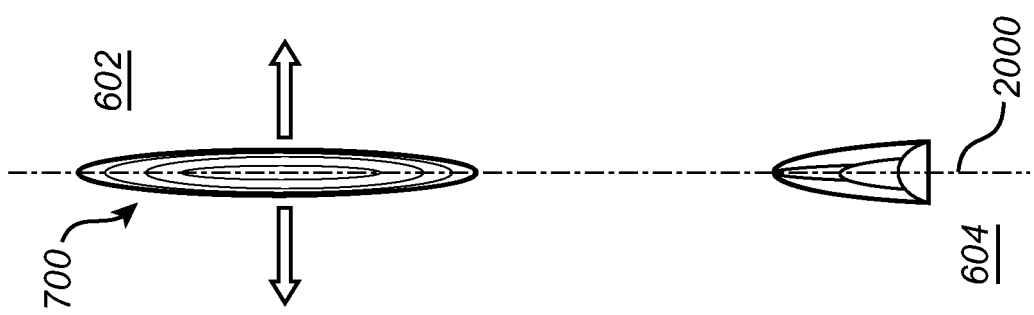
Figure 6A:
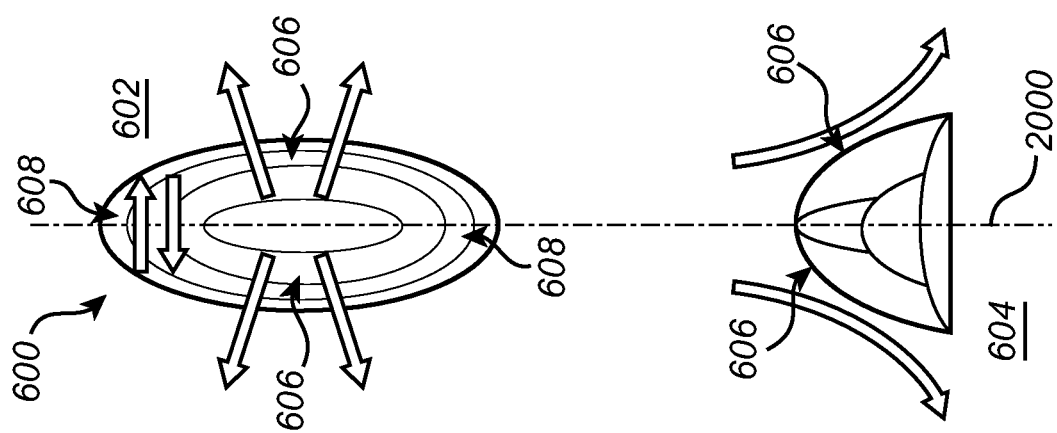

FIG. 6A is a top view 602 and a side view 604 of an internal bottom flow-guiding body 600 having a convex outer shape. Thus, the flow-guiding surfaces 606 have a convex shape and is configured to direct flow of hydrogen from the inlet to the outlet as described herein. Here, the flow-guiding surfaces 606 have a relatively shallow slope. Further, at side portions 608 a passage is formed between the internal bottom flow-guiding body 600 and the inlet valve pintle (not shown in FIG. 6A). The axis 2000 indicates the centre of the nozzle cap, thus, the internal bottom flow-guiding body 600 is here indicated as centralized in the nozzle cap.

FIG. 6B is a top view 602 and a side view 604 of an internal bottom flow-guiding body 700 having a convex outer shape but with a narrower side-ways extension compare to the internal bottom flow-guiding body 600 shown in FIG. 6A. The internal bottom flow-guiding body 700 is configured as barrier type structures that allows minimal cross-flow between the sides of the internal bottom flow-guiding body 700.

FIG. 6C is a top view 602 and a side view 604 of an internal bottom flow-guiding body 800 having a convex outer shape similar to the internal bottom flow-guiding body 600 shown in FIG. 6A. However, the internal bottom flow-guiding body 800 is arranged off-set from a centre 2000 of the bottom of the nozzle cap. Thus, the internal bottom flow-guiding body 800 is located such that more of the hydrogen stream is directed towards a first side 802 of the internal bottom flow-guiding body 800 than towards a second side 804. In other words, the off-centre location of the internal bottom flow-guiding body 800 favours direction the hydrogen flow towards the first side 802.

FIG. 6D is a top view 602 and a side view 604 of an internal bottom flow-guiding body 900 having a convex outer shape. A difference between the internal bottom flow-guiding body 900 and the internal bottom flow-guiding body 600 is that the slopes of the flow-guiding surfaces 906 are steeper than the flow-guiding surfaces 606 of the internal bottom flow-guiding body 600. The steeper slope leads to a smaller passage 908 which advantageously reduces the cross-flow at across the centre 2000 of the nozzle cap.

FIG. 6E is a top view 602 and a side view 604 of an internal bottom flow-guiding body 1000 adapted to fill out one side of the nozzle cap opposite the outlet. Thus, on one side of the internal bottom flow-guiding body 1000 there is a flow-guiding surface 1006 adapted to guide a flow of hydrogen towards an outlet. The other side of the internal bottom flow-guiding body 1000 fills out the volume of the nozzle cap on that side. Thus, very little flow is directed towards the fill out side of the nozzle cap.

FIG. 6F is a top view 602 and a side view 604 of an internal bottom flow-guiding body 1100 having a concave outer shape. The flow-guiding surfaces 1106 having a concave shape are advantageous for directing the flow of hydrogen towards the centre of the outlets 108, in other words, the concave shape of the flow-guiding surfaces 1106 provides for converging the flow towards the centre of the outlets 108.

Figure 7:
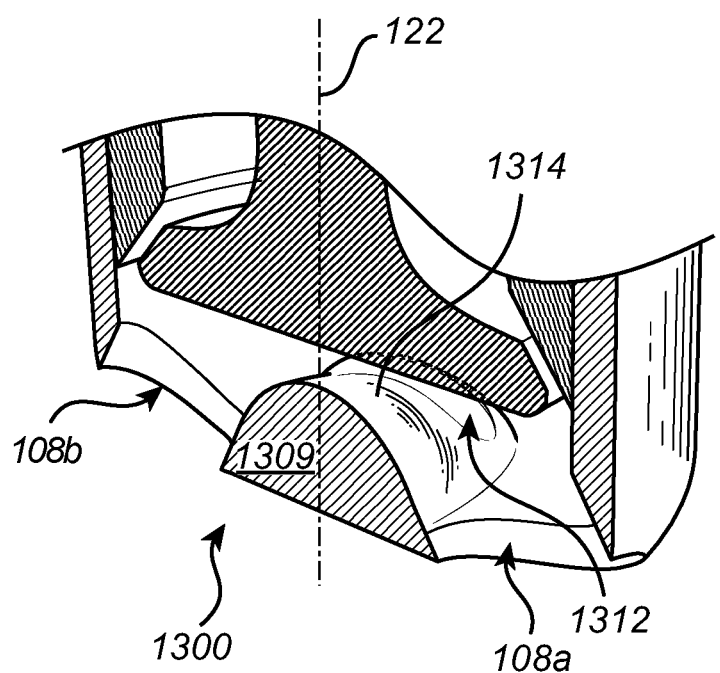
FIG. 7 is a perspective cross-sectional view including a nozzle cap according to example embodiments of the invention.

FIG. 7 conceptually illustrates a perspective cross-section of a nozzle cap 1300 according to embodiments of the invention. Here, the internal bottom flow-guiding body 1309 comprises a flow-guiding element 1312 protruding from the upper ridge 1314 of the internal bottom flow-guiding body 1309. This provides for adjusting of the hydrogen-flow in the nozzle cap towards preferred directions. The flow-guiding element 1312 is specifically adapted to guide the minor flow going from the valve-seat in the region between the nozzle cap outlets 108*a,b* such that the flow in this location between the outlets is better directed towards the outlets 108*a,b*. The flow-guiding element 1312 is thus designed to redirect downwards going flow reaching the bottom flow-guiding body 1309 at locations between the outlets 108*a*, 108*b*.

Although other possibilities are conceivable, the nozzle caps are preferably made of steel.

Even though the invention has been described with reference to specific exemplifying embodiments thereof, many different alterations, modifications and the like will become apparent for those skilled in the art. Accordingly, it is to be understood that the present invention is not limited to the embodiments described above and illustrated in the drawings; rather, the skilled person will recognize that many changes and modifications may be made within the scope of the appended claims.

The invention claimed is:

1. A nozzle cap for a fuel injection nozzle operable in a hydrogen internal combustion engine, the nozzle cap comprising:
   an inlet for receiving a flow of hydrogen controllable by an inlet valve arrangeable in the inlet,
   at least one outlet for providing an exit flow of hydrogen, and
   an internal bottom flow-guiding body arranged at a bottom side of the nozzle cap downstream of the inlet in a nozzle cap volume, the internal bottom flow-guiding body comprising a convex ridge protruding towards the inlet and comprises a flow-guiding surface for re-directing a flow of hydrogen from the inlet towards the outlet, the convex ridge is centralized in the bottom of the nozzle cap and is arranged to reach from side-to-side across the entire nozzle cap volume.

2. The nozzle cap according to claim 1, wherein the outlet comprises a first exit surface and a second exit surface forming the outlet, wherein the shape of the first exit surface substantially follows the shape of the second exit surface, such that the exit flow of hydrogen from the outlet at the first exit surface is in substantially the same direction as the exit flow of hydrogen at the second exit surface.

3. The nozzle cap according to claim 1, further comprising at least a first internal side flow-guiding body arranged at a side-wall surface of the nozzle cap and protruding inwards in a nozzle cap volume, for guiding the flow of hydrogen towards the at least one outlet.

4. The nozzle cap according to claim 3, wherein the outlet comprises a first exit surface and a second exit surface forming the outlet, wherein the shape of the at least one first internal side flow-guiding body substantially follows a shape of the flow-guiding surface of the internal bottom flow-guiding body, such that the exit flow of hydrogen from the outlet at the first exit surface is in substantially the same direction as the exit flow of hydrogen at the second exit surface.

5. The nozzle cap according to claim 1, wherein the outlet comprises a first exit surface and a second exit surface forming the outlet, wherein the first exit surface and a second exit surface together form a conical outlet.

6. The nozzle cap according to claim 1, wherein the outlet comprises a first exit surface and a second exit surface, wherein the flow-guiding surface of the internal bottom flow-guiding body is arranged next to the second exit surface, the flow-guiding surface and the second exit surface are configured to co-operatively direct the exit flow of hydrogen at the second exit surface in the same direction as the exit flow of hydrogen at the first exit surface.

7. The nozzle cap according to claim 1, wherein the internal bottom flow-guiding body is configured to redirect a flow of hydrogen towards to two opposite sides of the nozzle cap.

8. The nozzle cap according to claim 7, comprising two outlets arranged on opposite sides of the internal bottom flow-guiding body, wherein the internal flow-guiding bodies are configured to redirect a flow of hydrogen from the inlet towards the two outlets.

9. The nozzle cap according to claim 8, wherein the internal bottom flow-guiding body is shaped to fill-out the volume between two outlets in the nozzle cap volume.

10. The nozzle cap according to claim 1, wherein the internal bottom flow-guiding body is centralized in the bottom of the nozzle cap.

11. The nozzle cap according to claim 1, wherein the internal bottom flow-guiding body is arranged off-set from a center of the bottom of the nozzle cap.

12. The nozzle cap according to claim 1, wherein the internal bottom flow-guiding body is shaped to substantially fill the side of the nozzle cap opposite the outlet.

13. The nozzle cap according to claim 1, wherein the number of outlets is more than two, wherein the internal bottom flow-guiding body comprising a set of flow-guiding surfaces for re-directing a flow of hydrogen towards each of the outlets.

14. The nozzle cap according to claim 1, wherein the internal bottom flow-guiding body has a convex outer shape.

15. The nozzle cap according to claim 1, wherein the internal bottom flow-guiding body has a concave outer shape.

16. The nozzle cap according to claim 1, wherein the internal bottom flow-guiding body comprises flow-guiding elements protruding from the upper ridge of the internal bottom flow-guiding body for providing further adjustments of the hydrogen-flow in the nozzle cap.

17. A fuel injection nozzle comprising an inlet valve and a nozzle cap according to claim 1.

18. A hydrogen internal combustion engine comprising a fuel injection nozzle according to claim 17.

19. A vehicle comprising a fuel injection nozzle according to claim 17.

* * * * *